(12) United States Patent
Ahn et al.

(10) Patent No.: US 9,561,839 B2
(45) Date of Patent: Feb. 7, 2017

(54) FLOATING TYPE STRUCTURE

(71) Applicant: SAMSUNG HEAVY IND. CO., LTD., Seoul (KR)

(72) Inventors: Dang Ahn, Geoje (KR); Youngyeoun Han, Geoje (KR); Young Mok Yoo, Geoje (KR); Hyun-Jun Kim, Daegu (KR); Min-Gi Han, Geoje (KR)

(73) Assignee: Samsung Heavy Ind. Co., Ltd. (KR)

( * ) Notice: Subject to any disclaimer, the term of this patent is extended or adjusted under 35 U.S.C. 154(b) by 7 days.

(21) Appl. No.: 14/411,776

(22) PCT Filed: Jun. 21, 2013

(86) PCT No.: PCT/KR2013/005483
§ 371 (c)(1),
(2) Date: Dec. 29, 2014

(87) PCT Pub. No.: WO2014/003366
PCT Pub. Date: Jan. 3, 2014

(65) Prior Publication Data
US 2015/0197318 A1    Jul. 16, 2015

(30) Foreign Application Priority Data

Jun. 29, 2012 (KR) .................. 10-2012-0071242
Jun. 29, 2012 (KR) .................. 10-2012-0071248
Jun. 29, 2012 (KR) .................. 10-2012-0071250

(51) Int. Cl.
*E02B 17/08*    (2006.01)
*B63B 35/00*    (2006.01)
(Continued)

(52) U.S. Cl.
CPC ............. *B63B 35/003* (2013.01); *B63B 9/065* (2013.01); *E02B 17/0034* (2013.01);
(Continued)

(58) Field of Classification Search
USPC ............... 405/196, 197, 199, 203; 248/218.4
See application file for complete search history.

(56) References Cited

U.S. PATENT DOCUMENTS 2,924,077 A    2/1960  Le Tourneau
3,011,467 A   12/1961  Le Tourneau
(Continued)

FOREIGN PATENT DOCUMENTS

CN    201099855    8/2008
EP      2275341    1/2011
(Continued)

OTHER PUBLICATIONS

Singapore Written Opinion dated Sep. 4, 2015 issued in corresponding Singapore application No. 11201408748T.
(Continued)

*Primary Examiner* — Sean Andrish
(74) *Attorney, Agent, or Firm* — Harness, Dickey & Pierce, P.L.C.

(57) ABSTRACT

There is provided a floating structure. The floating structure according to the present invention comprises a main body including leg wells; legs penetrating the leg wells and having cords and racks; a unit installation means positioned in the main body as surroundings of the leg wells. According to the present invention, a jacking unit is installed in the main body by the unit installation means.

17 Claims, 12 Drawing Sheets

(51) Int. Cl.
*F03D 1/00* (2006.01)
*E02B 17/02* (2006.01)
*B63B 9/06* (2006.01)
*E02B 17/00* (2006.01)
*B63B 35/44* (2006.01)
*B63B 27/10* (2006.01)

(52) U.S. Cl.
CPC ............ *E02B 17/02* (2013.01); *E02B 17/021* (2013.01); *E02B 17/0818* (2013.01); *F03D 1/005* (2013.01); *B63B 27/10* (2013.01); *B63B 35/44* (2013.01); *B63B 2009/067* (2013.01); *B63B 2035/446* (2013.01); *E02B 2017/006* (2013.01); *E02B 2017/0047* (2013.01); *E02B 2017/0091* (2013.01); *Y02E 10/727* (2013.01)

(56) References Cited

U.S. PATENT DOCUMENTS

| | | | |
|---|---|---|---|
| 3,183,676 A | | 5/1965 | Le Tourneau |
| 4,203,576 A | * | 5/1980 | Sutton ................ E02B 17/0818 254/89 R |
| 2005/0158125 A1 | | 7/2005 | Thomas et al. |
| 2009/0090191 A1 | | 4/2009 | Lenders et al. |
| 2012/0055389 A1 | * | 3/2012 | Quah .................... E02B 17/021 114/265 |

FOREIGN PATENT DOCUMENTS

| | | |
|---|---|---|
| GB | 2150178 | 6/1985 |
| JP | 58-030887 | 2/1983 |
| JP | S58-030887 | 2/1983 |
| JP | S59-076318 | 5/1984 |
| JP | H2-083192 | 6/1990 |
| JP | 10-230897 | 9/1998 |
| JP | H10-230897 | 9/1998 |
| KR | 10-1985-0004220 | 7/1985 |
| KR | 1985-0004220 | 7/1985 |

OTHER PUBLICATIONS

Extended European Search Report dated Jan. 15, 2016 issued in corresponding European Patent Application No. 13808607.9.

* cited by examiner

FLOATING TYPE STRUCTURE

CROSS-REFERENCE TO RELATED APPLICATIONS

This application is a U. S. National Stage of International Application No. PCT/KR2013/005483, filed on Jun. 21, 2013 and published in Korean as WO 2014/003366 A1 on Jan. 3, 2014. This application claims priority to Korean Application Nos. 10-2012-0071242, 10-2012-0071248, and 10-2012-0071250, all of which were filed on Jun. 29, 2012. The entire disclosures of the above applications are incorporated herein by reference.

TECHNICAL FIELD

The present invention relates to a floating type structure, and more particularly to a floating type structure for transporting a manufactured marine wind turbine unit on the sea and installing the marine wind turbine at a wind turbine installing site.

BACKGROUND ART

Demands for developing environment-friendly energy are increasing. Power generation using a wind turbine is spotlighted globally.

For the installation of a wind turbine, environmental conditions and installation conditions should be considered. For example, as the environmental conditions, an installation site of the wind turbine, for the realization of effective rotation by blades, requires wind speed faster than a preset wind speed and a very wide area.

Moreover, as the installation conditions, the installation site of the wind turbine should be free from noise caused by the drive of the wind turbine.

Recently, for the relative freedom from the above environmental conditions or the restrictions, concerns to the wind turbines are increasing.

A marine wind turbine may be installed by various ways, but can be generally installed such that parts are manufactured into several units on the land, and that the manufactured units are transported on the sea for assembly.

For example, a wind turbine installation vessel (WTIV) is to transport the marine wind turbine unit manufactured on the land to the installation site and to install the same at the installation site on the sea.

The WTIV may be used in a transit mode and a jack-up mode in view of operating properties.

Specifically, the WTIV sails to a site where the marine turbine is installed in the transit mode. In the transit mode, legs may be elevated up to the upper side of a main body for the purpose of decreasing resistance caused by sea water. After that, the operating mode of the WTIV is switched to the jack-up mode such that the legs are lowered down and are driven into the seabed and the main body is elevated along the legs such that the main body may be spaced apart from the surface of the sea by a preset distance. When the main body reaches a preset position, the WTIV stops to move the main body and carries out the installation of the marine wind turbine, and moves to a next installation site by performing the above installation order reversely after the installation.

In the floating structure, as a leg support or a jack case supporting and driving the legs projects upward from a hull of the floating structure or a main deck of the main body, the space availability of the main deck may be relatively deteriorated in loading loads by functions of the floating structure.

For example, in a case when the floating structure is a ship or a marine structure for installing the marine wind turbine, a shipping space for the load such as a plurality of blades, a nacelle, a tower, and the like corresponding to parts of the marine wind turbine may be restricted due to the leg support projecting upward from the main deck.

Moreover, when to dispose the jack case in the floating structure simply, it is difficult to install the jack case in an internal structural material of the floating structure and it is required to solve sealing of the jacking unit, installation of a plurality of jacking units including motors and pinions in the jack case and maintenance thereof.

DISCLOSURE

Technical Problem

The present invention provides a floating structure in which an independent installing jack case integrated with a plurality of jacking units does not protrude outside a main deck but is installed in a main body.

The present invention provides a floating structure for installing a jacking unit through a unit access such that the installation of the jacking unit and maintenance thereof may be easily carried out.

The present invention provides a floating structure for providing a jacking unit installed in a jacking unit recess in a manner of a drawer assembly type such that the installation of the jacking unit and maintenance thereof may be easily carried out.

Technical Solution

In accordance with an aspect thereof, the present invention provides a floating structure comprising: a main body including leg wells; legs penetrating the leg wells and having cords and racks; at least one jacking unit generating a lifting force to move the legs and the main body in the vertical direction relatively; and a unit installation means coupled with the main body to position the jacking unit in the main body.

Wherein the unit installation means may comprise: a case installation unit disposed to correspond to the cords and the racks of the legs along the inner walls of the leg wells; and a jack case installed in the case installation unit to accommodate the jacking unit to move the legs in the vertical direction.

Wherein the jack case may be positioned in the case installation unit to prevent protrusion above the main deck of the main body.

Wherein the jack case may include a housing in which the jacking unit is positioned; wherein the housing comprises: a bottom plate having passing recesses through which the cords, the racks, and an end of a brace of the legs pass vertically; lateral plates protruded from both sides of the bottom plate; an upper plate connecting upper ends of the lateral plates to each other and having the same passing recesses as the passing recesses of the bottom plate; a pair of front plates connecting the lateral plates, the bottom plate, and front ends of the upper plates and spaced apart from each other by a distance such that the cords of the legs, the racks, and the end of the brace may pass therethrough in the vertical direction; a rear plate separately coupled to rear ends of the lateral plates, the bottom plate, and the upper plate;

and bulkheads spaced apart from the front plates in parallel, connected between the lateral plates, and having installation holes of the same size as those of the jacking unit and the unit housing to insert the jacking unit thereinto; and finishing plates connected between the bulkheads and the front plates around the installation holes.

Wherein the jacking unit may comprise: bearing blocks 1111 installed to the front plates; pinion shafts rotatably coupled in the bearing blocks; pinions coupled around the pinion shafts at the rear sides of the bearing blocks; unit housings coupled with sealing at the front side and rims of the unit housings coupled in the installation holes of the bulkheads; gearboxes installed in the unit housings and transmitting a driving force to the pinion shafts; and motors connected to the gearboxes to drive the gearboxes.

Wherein the case installation unit may include one more maintenance passage allowing access to the jack case.

The floating structure may further comprise lifting lugs coupled to an upper side of the housing.

Wherein the unit installation means comprises at least unit mounting portion to receive the jacking unit and positioned in the main body; wherein the unit mounting portion includes: openings in which the leg wells are positioned; first unit accesses penetrating the main deck of the main body; and second unit accesses through which the jacking unit moves.

The jacking unit may comprise: a pinion shaft having a pinion engaged with the rack; a gearbox transmitting a driving force to the pinion shaft; and a motor driving the gearbox.

Wherein entrance rims of the first unit accesses may be formed with coamings.

Wherein the unit installation may further comprises: guide rails extending toward the openings; and moving carts to move the jacking unit on the guide rails.

Wherein the moving cart comprises: wheels rolling along the guide rails; and a moving plate or a frame to which the wheels are rotatably coupled and on which the jacking units are placed.

Wherein the unit mounting portion further comprises a ceiling rail type moving device; wherein the ceiling rail type moving device comprises: ceiling rails extending toward the openings; a bed on which the jacking unit is placed; and rollers connected to the bed and moving while being hung from the ceiling rails.

The unit mounting portion may further comprise brackets fixing the jacking unit transported by the ceiling rail type moving device.

The unit mounting portion may further comprise an inner door opening and closing the unit mounting portion.

Wherein the unit mounting portion further a support plate maintaining a horizontally-opened state of the inner door.

The unit installation means further comprises a jacking unit recess positioned in the main body as surroundings of the leg wells; wherein the jacking unit recess has unit a unit mounting space and the jacking unit is installed in the unit mounting space.

Wherein the jacking unit recess may comprise: a first compartment spaced apart in a first direction of the jacking unit recess; a second compartment spaced apart in a second direction perpendicular to the first direction; and a third compartment communicated with the first and the second compartments to finish a side of each of the unit mounting spaces.

Wherein the jacking unit may comprise: a unit housing spaced apart from the pinion engaged with the rack of the legs; a sealing disposed between the unit housing and the pinion; and a gearbox disposed in the unit housing and transmitting a driving force to the pinion.

Wherein the unit housing comprises flanges formed at a rim of the unit housing facing the third compartment and the flanges are coupled with the third compartment.

Wherein the unit housing may comprise a rim protruded from the outer surface of the unit housing wherein the rim of the unit housing is coupled with a rim stopper of the inner walls.

Wherein the rim of the unit housing of the jacking unit and the rim stopper are overlapped with each other and coupled with each other with a plurality of bolts, further comprising head-protective covers covering heads of the bolts.

Herein the jacking unit is inserted into the unit mounting space by sliding or rolling by rollers.

Advantageous Effects

According to the embodiments of the present invention, a jack case is installed in a main body inside a leg well of the main body of the floating structure according to the present invention. As a result, a shipping space for load to be shipped on the main body may be increased and space availability of a main deck of the main body may be also increased.

Moreover, according to the embodiments of the present invention, a lifting lug is attached to an independent jack case having a plurality of jacking units. As a result, assembly between a main body of the floating structure and the jack case may be carried out easily.

In addition, according to the embodiments of the present invention, the center of gravity of the main body can be lowered so that movability of the main body can be enhanced.

According to another embodiment of the present invention, the weight of an existing jack case can be reduced. As a result, the reduction of weight may bring reduction of the number of assembly processes and material costs.

According to another embodiment of the present invention, the jacking units are positioned in the main body to reduce noise emitted outward. As a result, a worker who works outside the main body may be protected from noise.

According to another embodiment of the present invention, a plurality of jacking units may be installed through a first unit access in the vertical direction of the main body and a second unit access in the horizontal direction thereof. Thus, the installation and maintenance of the jacking units may be easily carried out.

According to still another embodiment of the present invention, a plurality of jacking units and jacking unit recesses, which are installed in a manner of the drawer assembly type, may be provided. Thus, the installation and maintenance of the jacking unit may be easily carried out.

BEST MODE

Hereinafter, embodiments of the present invention will be described in detail with reference to the drawings.

Furthermore, in the following description of the present invention, if the detailed description of the already known structure and operation may confuse the subject matter of the present invention, the detailed description thereof will be omitted.

A main body of a floating structure indicates a hull of the floating structure and may be called as a main body hereinafter.

In the following detailed description of the present invention, a vertical direction may indicate an upward direction from the bottom of the main body of the floating structure to a main deck, while a horizontal direction may indicate a direction perpendicular to the vertical direction of the main body, that is, the longitudinal direction or a transversal direction of the main body.

Figure 1:
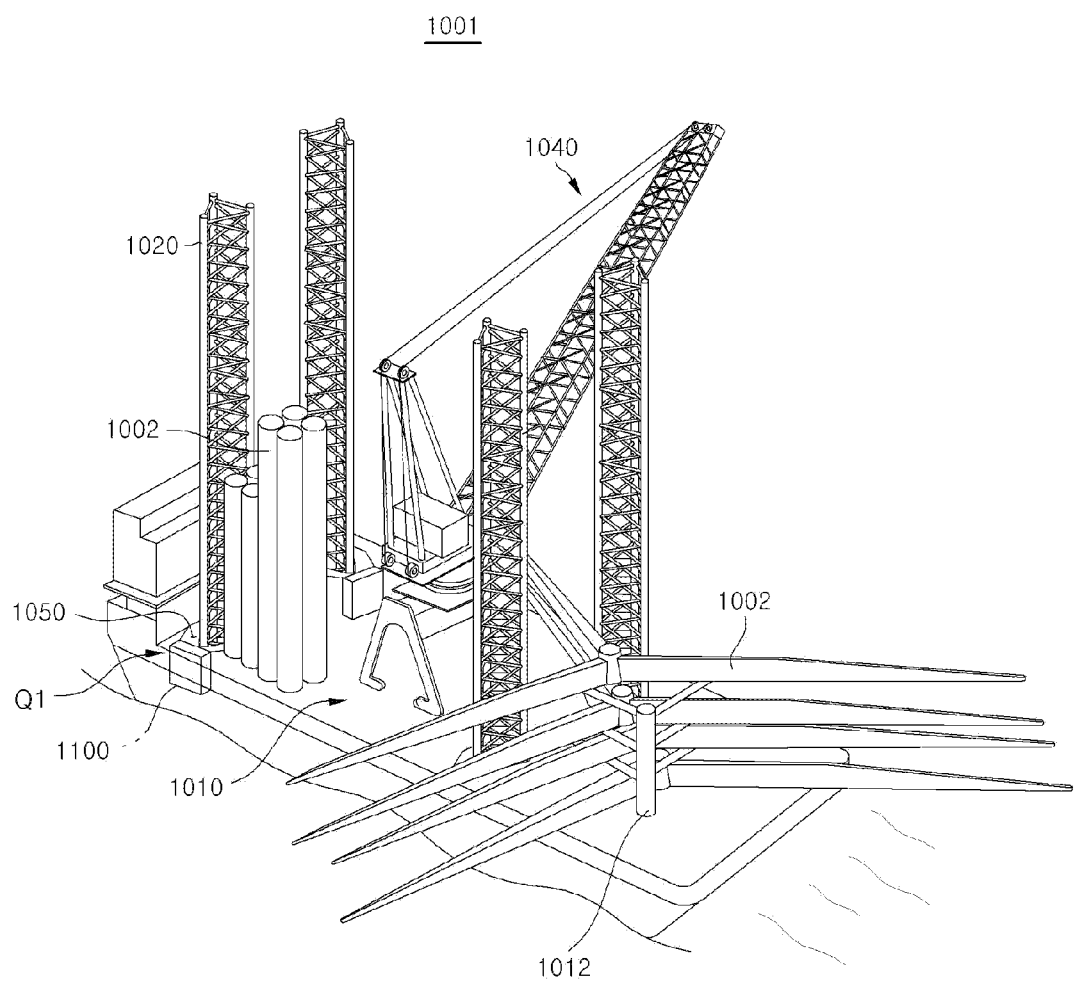
FIG. 1 is a perspective view illustrating a floating structure according to a first embodiment of the present invention.

Referring to FIG. 1, a floating structure 1001 may include a main body 1010 floating on the water, legs 1020 vertically penetrating leg wells 1050, and a first unit installation means Q1 for positioning at least one jacking unit that generates for generating a lifting force causing a relative movement of the legs 1020 and the main body 1010 in the vertical direction in the main body 1010.

Figure 4:
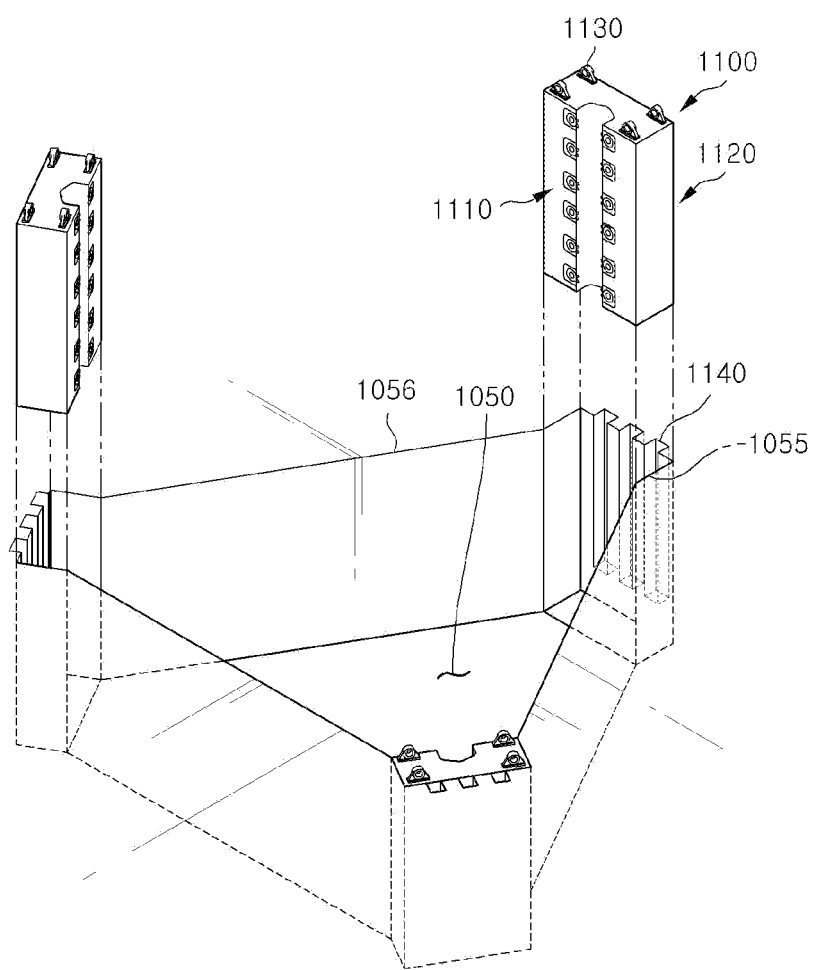
FIG. 4 is a perspective view illustrating a method of installing the jack case shown in FIG. 2.

In this case, the first unit installation means Q1, as illustrated in FIG. 4, may include a built-in jack case 1100 and a case installation unit 1055.

The floating structure 1001 may be a wind turbine installation vessel (WTIV) or a jack-up platform. For example, according to a first embodiment of the present invention, the floating structure 1001 may be the WTIV. In addition, loads 1002 as an object to be transported or installed on the sea water by the floating structure 1001 may be the marine wind turbine itself or parts thereof. However, according to the spirit of the present invention, any floating structure, including the first unit installation means Q1 or a second or a third unit installation means, which will be described in following second and third embodiments of the present invention, may fall within the scope of the present invention.

The main body 1010, as illustrated in FIG. 1, may have a floatable rectangular planar structure. The main body 1010 may have a structure wider, lower, and shorter than a general merchant ship (for example, a container ship). However, this is only an example of the main body and the main body 1010 according to the spirit of the present invention may have any three-dimensional structure under a condition where a plurality of jack cases 1100 may be installed in the main body 1010.

The loads 1002 required performing functions of the floating structure 1001 and a rack unit for the loads 1012 may be loaded on the main body 1010. In the first embodiment, blades, a nacelle, and a tower as parts of the marine wind turbine may be loaded on the main body 1010 as the loads 1002.

The main body 1010 may be provided with a thrust unit (not shown) for movement and a position control.

The legs 1020 may be plural according to purpose of use of the floating structure 1001, and in this embodiment, the legs 1020 will be described as respective pairs, that is, four pairs in total that are provided at the portside and the starboard.

The legs 1020 are installed to penetrate the main body 1010 vertically, while the main body 1010 is formed with leg wells 1050 through which the legs 1020 penetrate. The legs 1020 may move downward the main body 1010 and be fixed in the seabed. The legs 1020 may have stiffness bearing the load of the main body 1010 in a jack-up state. The legs 1020 may be manufactured in various structures such as a cylindrical structure, a triangular structure, a rectangular truss structure, a triangular truss structure, and the like.

Hereinafter, in the first embodiment and the following second and third embodiments, the legs 1020 of a triangular truss structure will be described.

The jack case 1100 may be arranged in a triangular form along an inner wall of the leg wells 1050 through which the legs 1020 pass. The jack case 1100 may support the legs 1020 such that the main body 1010 moves relatively in the vertical direction and provide a lifting force to the legs 1020.

The main body 1010 may be provided with a crane 1040 transporting the loads 1002 such as blades, a nacelle, and a tower such that the marine wind turbine may be installed.

The jack case 1100 may be a driving unit elevating or lowering the legs 1020 or the main body 1010 using the relative movement against the legs 1020. By operations of the jack case 1100, the legs 1020 may be moved in the vertical direction with respect to the main body 1010 or the main body 1010 may be moved in the vertical direction with respect to the legs 1020 after the legs 1020 are fixed in the seabed, that is, be elevated or lowered. For example, since the jack case 1100 is coupled with a jacking unit having a pinion and a motor while racks are provided at both sides of cords as column members of the legs 1020, the vertical-directional relative movements between the legs 1020 and the main body 1010 may be generated due to interlock between the pinions and the racks.

The floating structure 1001 as described above may be operated in a transit mode and a jack-up mode.

Figure 2:
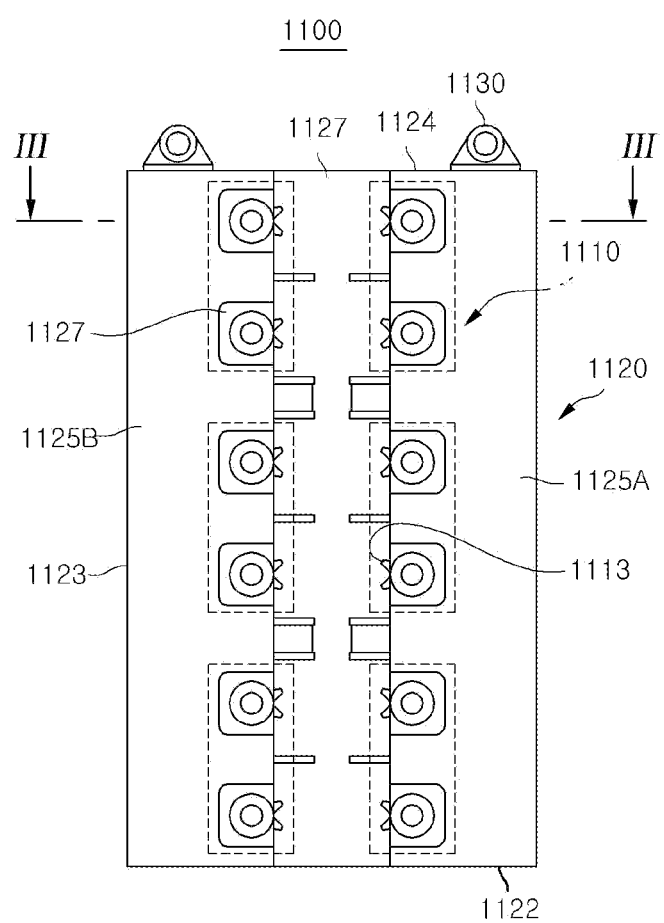
FIG. 2 is a front view illustrating a jack case show in FIG. 1.

Referring to FIG. 2, the jack case 1100 may be independently assembled in a module when the jack case 1100 is manufactured. After that, the jack case 1100 may be installed or coupled in the main body 1010 of the floating structure in an independent installation.

The jack case 1100 may include a housing 1120 at which the jacking units 1110 are positioned. Here, the jacking units 1110 may include a motor, a pinion, and a gearbox, respectively.

Moreover, a plurality of the jacking units 1110 may be installed in the jack case 1100 in the vertical direction and the horizontal direction of the jack case 1100.

Meanwhile, in the first embodiment, lifting lugs 1130 coupled to an upper side of the housing 1120 may be further provided.

The lifting lugs 1130 may be cut away and separated after the jack case 1100 is installed to a case installation unit 1055 as shown in FIG. 4, or remain on the upper side of the housing 1120 for the maintenance.

The lifting lugs 1130 protrude. By changing design, the lifting lugs 1130 may be positioned in recesses (not shown) of an upper plate 1124 of the housing 1120.

As such, since the lifting lugs 1130 may protrude or be depressed according to their shapes or types, the lifting lugs 1130 may be not restricted to the shape as shown in FIG. 4.

Figure 3:
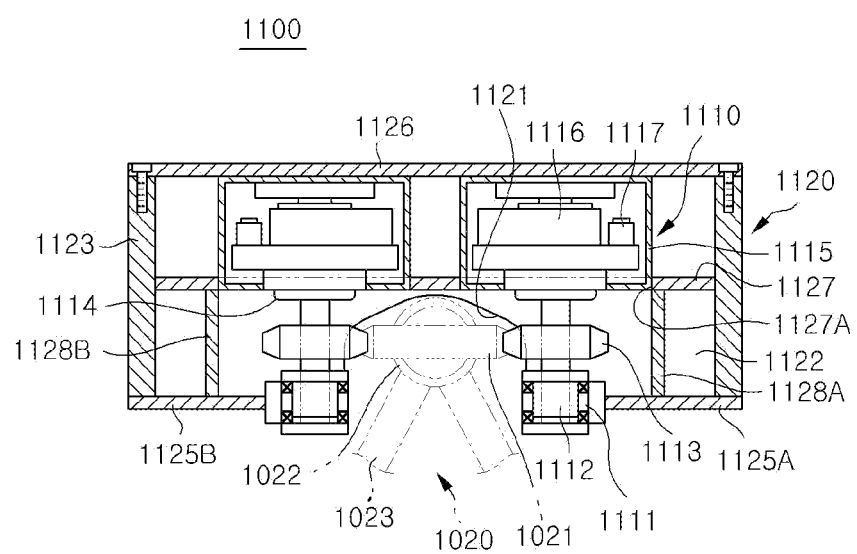
FIG. 3 is a sectional view taken along the line III-III of FIG. 2.

Referring to FIGS. 2 and 3, the housing 1120 may include a bottom plate 1122 having passing recesses 1121 through which cords 1022, racks 1021, and an end of a brace 1023 of the legs 1020 pass vertically, lateral plates 1123 protruded from both sides of the bottom plate 1122, and an upper plate 1124 connecting upper ends of the lateral plates 1123 to each other and having the same passing recesses as the passing recesses 1121 of the bottom plate 1122.

Moreover, the housing 1120 may include a pair of front plates 1125A and 1125B connected to the lateral plates 1123, the bottom plate 1122, and front ends of the upper plates 1124 and spaced apart from each other by a distance such that the cords 1022 of the legs 1020, the racks 1021, and the end of the brace 1023 may pass therethrough in the vertical direction, and a rear plate 1126 separately coupled to rear ends of the lateral plates 1123, the bottom plate 1122, and the upper plate 1124.

The rear plate 1126 and the unit housing 1115 may be further provided with access holes (not shown) to communicate with a maintenance passage 1140 as illustrated in FIG. 4.

The housing 1120 may further include bulkheads 1127. In this case, the bulkheads 1127 may be spaced apart from the front plates 1125A and 1125B by a distance in parallel.

The bulkheads 1127 may be disposed between the lateral plates 1123. Both ends of the bulkheads 1127 may be connected to the inner surfaces of the lateral plates 1123.

The bulkheads 1127, in order to insert the jacking units 1110, may have installation holes 1127A of the same size as that of the unit housing 1115 of the jacking units 1110.

Finishing plates 1128A and 1128B connected between the bulkheads 1127 and the front plates 1125A and 1125B around the installation holes 1127A may be further provided.

The lateral plates 1123, the bottom plate 1122, the upper plate 1124, the finishing plates 1128A and 1128B, and the bulkheads 1127 may be coupled with or fixed to the corresponding plates by welding.

The unit housings 1115 of the jacking units 1110 may be inserted into the installation holes 1127A of the bulkheads 1127 or be fixed by a general attachable coupling device (not shown).

The jacking unit 1110 may include bearing blocks 1111 installed to the front plates 1125A and 1125B, pinion shafts 1112 rotatably coupled in the bearing blocks 1111, and pinions 1113 coupled around the pinion shafts 1112 at the rear sides of the bearing blocks 1111.

The jacking unit 1110 may include sealings 1114 coupled around the pinion shafts 1112 at the rear sides of the pinions 1113, the unit housings 1115 coupled with the sealings 1114 at the front side and rims of the unit housings coupled in the installation holes 1127A of the bulkheads 1127, gearboxes 1116 installed in the unit housings 1115 and transmitting a driving force to the pinion shafts 1112, and motors 1117 connected to the gearboxes 1116 to drive the gearboxes 1116.

Since the jack case 1110 installs a plurality of jacking units 1110 in a single housing 1120, the process of loading the jack case 1110 on the floating structure 1010 may be very easy.

Referring to FIG. 4, the lifting lugs 1130 may serve as a crane (not shown) provides in a shipyard to load the jack case 1100 or a device connected to a lifting cable of the crane when a crane built on the main body 1010 lifts.

Meanwhile, the main body 1010, in order to insert the jack case 1100 in the vertical direction along the leg wells 1050, may include case installation units 1055 having recesses corresponding to width and length of the jack case 1110 and height corresponding to a distance between the bottom of the main body 1010 and the main deck, and inner walls 1056 of the leg wells 1050 adjacent to the case installation units 1055.

The case installation units 1055, for the maintenance, may be further provided with one more maintenance passages extending downwardly from the main deck of the main body 1010.

The main deck upside the maintenance passages 1140 may be further provided with a cover such as a hatch (not shown). However, since entrances of the maintenance passages may not be limited to the main deck but communicate with access passages (not shown) formed in the main body 1010, the maintenance passages 1140 may not be limited to the shape as shown in FIG. 4.

The maintenance passages 1140 may have opened sides toward the jack case 1100 such that a worker may access the rear plates 1126 of the jack case 1100 through the maintenance passages 1140.

Height of the housing of the jack case 1100 may be identical to those of the case installation units 1055 or to a distance between a lower side (for example, the bottom of a ship) of the main body 1010 and the main deck.

The jack case 1100 may be inserted into the case installation units 1055 of the leg wells 1050 such that the jack case 1100 does not protrude outside the main deck or the lower side of the main body 1010 but is installed in the main body 1010.

Portions where the jack case 1100 brings in contact with the case installation units 1055 may be fixed to each other by welding or bolting.

For example, structural materials of the jack case 1100 and the case installation units 1055 may be fixed to each other by but welding.

If necessary, a reinforcing structure (not shown) may further cover between the jack case 1100 and the case installation units 1055 and be fixed by welding or bolting.

Hereinafter, a second embodiment of the present invention will be described with reference to FIGS. 5 to 7. Duplicated descriptions of elements that are already described in the first embodiment may be omitted. By doing so, only properties of the second embodiment will be described clearly.

Figure 5:
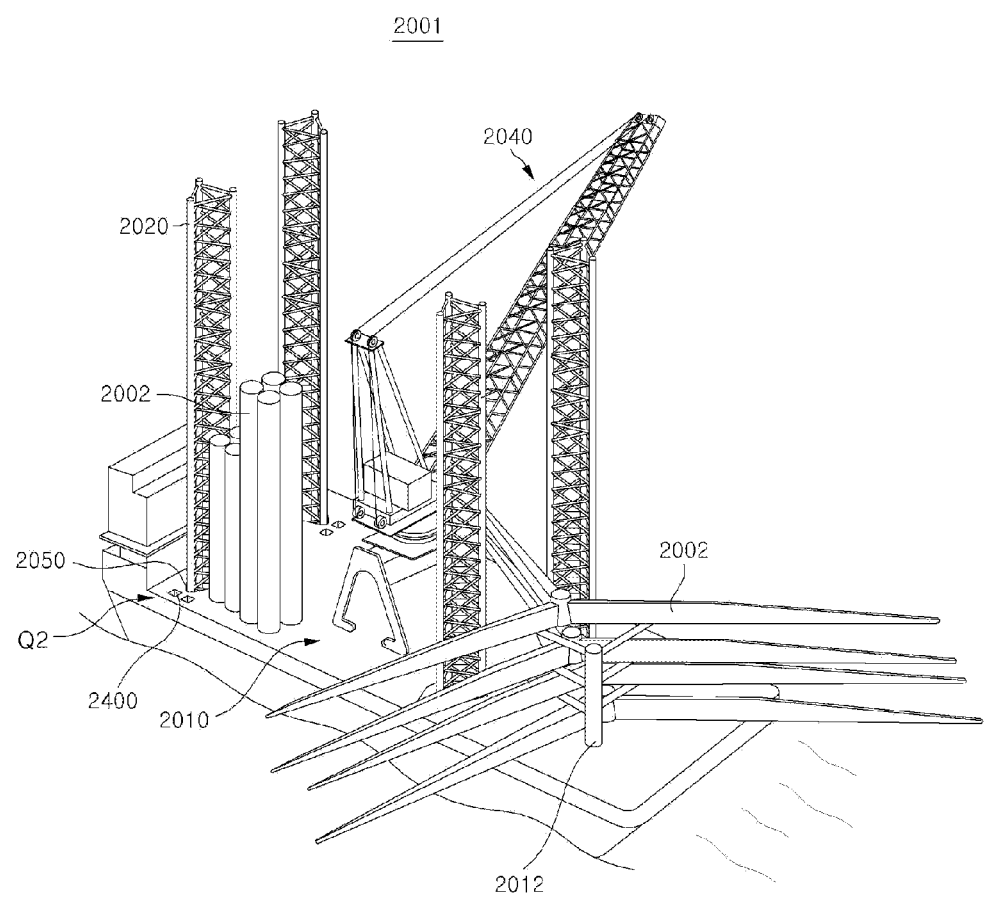
FIG. 5 is a perspective view illustrating a floating structure according to a second embodiment of the present invention.

Referring to FIG. 5, a floating structure 2001 may include a main body 2010, legs 2020, a crane 2040, leg wells 2050, and a second unit installation means Q2. Here, the unit installation means Q2 may also position a jacking unit in the main body 2010. The floating structure 2001 may include loads 2002 and a rack unit 2012 of the loads 2002.

Figure 6:
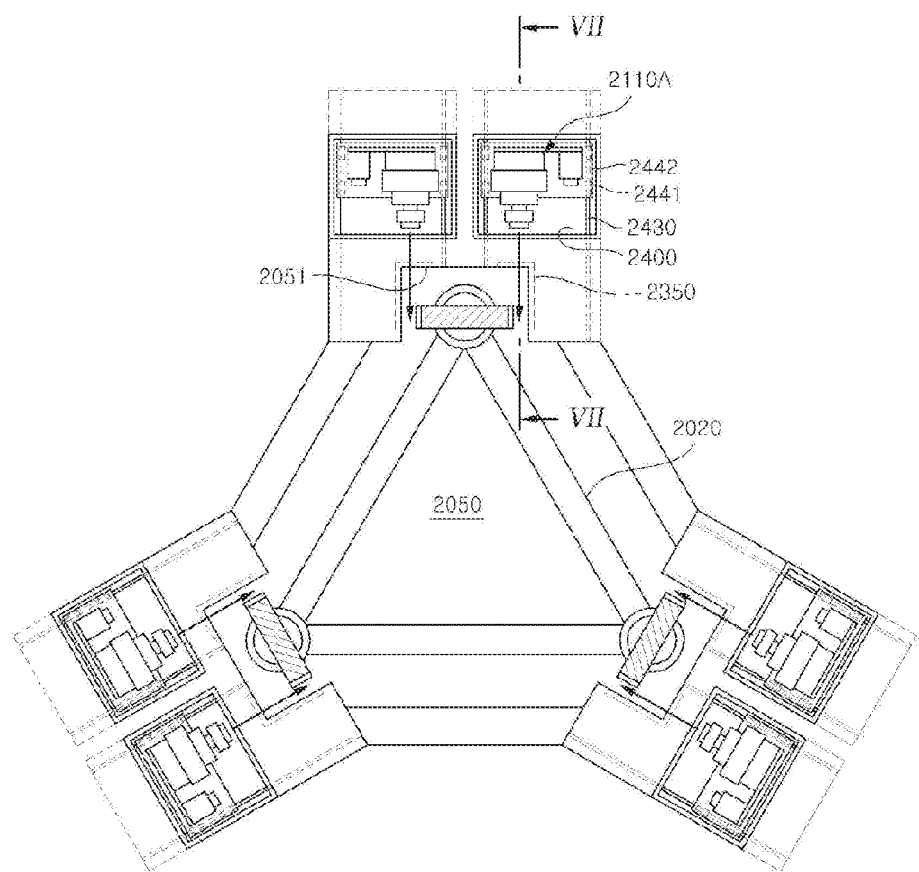
FIG. 6 is a plan view illustrating a leg well of the floating structure show in FIG. 5.
Figure 7:
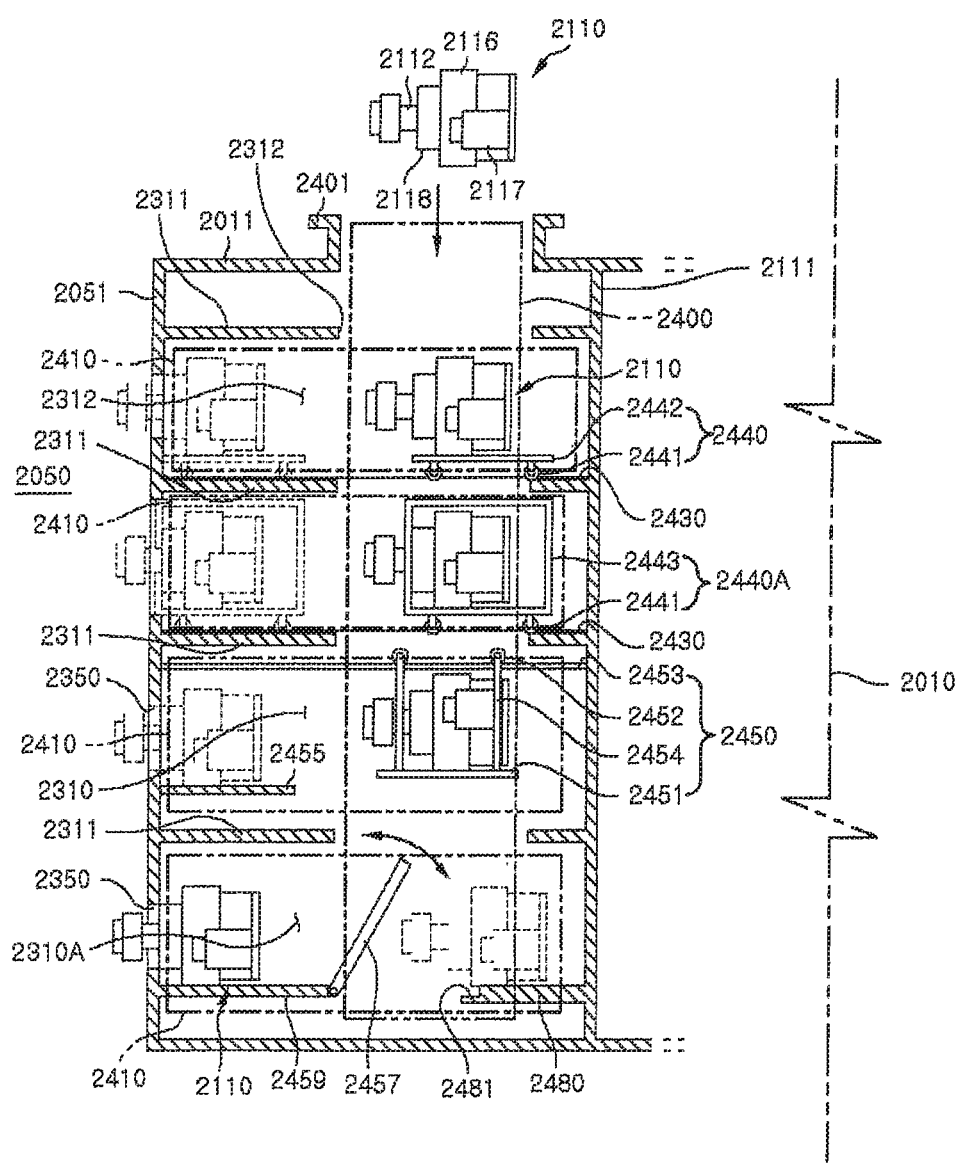
FIG. 7 is a sectional view taken along the line VII-VII of FIG. 6.

Referring to FIGS. 6 and 7, the second unit installation means may include first unit accesses 2400 penetrating a main deck 2011 in the vertical direction of the main body 2010 to install the jacking unit 2110 in the main body 2010, one more unit mounting portions 2310 defined by a plurality of horizontal plates 2311 of inner walls 2051 of the leg wells 2050 of the main body 2010, and second horizontal unit accesses 2410 communicating the inner spaces of the unit mounting portions 2310 with the first unit accesses 2410.

Each of the horizontal plates 2311 of the inner walls 2051 of the leg wells 2050 is formed with passage holes 2312 to form the first unit accesses 2400.

The unit mounting portions 2310 may be casing structures integrated in the main body 2010 and positioned in the main body 2010 to receive the jacking units 2010 respectively according to the number of the jacking units 2110.

Moreover, the inner walls 2051 of the leg wells 2050 may include openings 2350 through which pinions of the respective jacking units 2110 pass.

The shape of the openings 2350 may be modified according to type of the jacking units 2110 and the structure of box-shaped frames 2443 but not limited to a shape of a specific through-hole.

The first unit accesses 2400 and the second unit accesses 2410 are access structures manufactured with the same material as that of the main body 2010 and may be fixed and connected to the structural material of the main body 2010 by welding.

The entrance rims of the first unit accesses 2400 of the main deck 2011 of the main body 2010 may be formed with hatch coamings 2401 to be coupled with the hatch. The coamong 2401 comprise a raised section protruded from an upper portion of the main deck 2011.

The jacking units 2110 may have a unit housing or not and in this embodiment the jacking units 2110 without a unit housing will be described.

Each of the jacking units may include a pinion shaft 2112 having a pinion engaged with a rack of the legs, a gearbox 2116 transmitting a driving force to the pinion shaft 2112, a motor 2117 driving the gearbox 2116, and a lifting lug (not shown) provided in the gearbox 2116 and lifted by a crane and the like.

A sealing 2118 may be provided between the pinion shaft 2112 and the gearbox 2116 to prevent seawater from entering.

Meanwhile, the jacking units 2110, according to type and use thereof, may include a single motor 2117 and another gearbox (not shown) rotating two pinions simultaneously.

Referring to FIG. 7, the jacking units 2110 may be lowered through the first unit accesses 2400 in the vertical direction after lifted by a crane.

Moreover, the second unit accesses 2410 or the unit mounting portions 2310, for the horizontal movement of the jacking units 2110, may include guide rails 2430 extending from the first unit accesses 2400 to the unit mounting portions 2310, that is, extending toward the openings 2350.

The second unit accesses 2410 or the unit mounting portions 2310 may further include moving carts 2440 to move the jacking units 2110 on the guide rails 2430.

The guide rails 2430 may be supported to front and rear sides, both lateral sides, and the horizontal plates 2311 of the second unit accesses 2410 and be pairs. For example, as illustrated in FIG. 6, the inner lateral sides of the inner walls 2051 of the leg wells 2250 may be the front sides of the second unit accesses 2410 and the inner lateral sides of the inner walls 2111 extending downwardly from the main deck 2011 may be the rear sides of the second unit accesses 2410.

However, this support of the guide rails 2430 may not be limited thereto.

Referring to FIGS. 6 and 7, each of the moving carts 2440 may include a plurality of wheels 2441 rolling along the guide rails 2430 and a movable plate 2442 to which the wheels 2442 are rotatably coupled and on which the jacking unit 2110 is placed.

Box-shaped moving carts 2440A are devices moving the jacking units 2110 in the second unit accesses 2410 horizontally and may be further included in the second unit accesses 2410 or the unit mounting portions 2310 of the floating structure.

In this case, the box-shaped moving carts 2440A may include a plurality of wheels 2441 rolling along the guide rails 2430. The box-shaped moving carts 2440A may include box-shaped frames 2443 to which the wheels 2441 are rotatably coupled and on which the jacking units 2110 are placed. The box-shaped moving carts 2440A may include lifting lugs (not shown) coupled to the box-shaped frames 2443.

The box-shaped frames 2443 may be further formed with maintenance passages (not shown) of the jacking units 2110.

The moving carts 2440 and 2440A may be moved by motor-driven devices (not shown) or by a pushing force from workers.

The second unit accesses 2410 or the unit mounting portions of the floating structure may further include a ceiling rail type moving device 2450 to move the jacking units 2110 within the second unit accesses 2410 horizontally.

The ceiling rail type moving device 2450 may further include ceiling rails 2453, a bed 2451, and rollers 2452. In this case, the ceiling rails 2453 may be installed in the longitudinal direction of the second unit accesses 2410 or on the ceilings of the unit mounting portions 2310 and extend toward the openings 2350. The bed 2451 may be attached to the jacking units 2110 and place the jacking units 2110 thereon. The rollers 2452 may be connected to lifting wires 2454 that are connected to the bed 2451 and thus move while being hung from the ceiling rails 2453.

A portion of the ceiling rails 2453 may be fixed on the ceiling of the second unit accesses 2410 or the unit mounting portions 2350, while the other portion of the ceiling rails 2453 may be fixed to both lateral sides of the first unit accesses 2400 or the unit mounting portions 2350.

A plurality of holders (not shown) may be disposed between the ceiling rails 2453 and the ceilings of the second unit accesses 2410 and between the ceiling rails 2453 and the lateral sides of the first unit accesses 2400. By doing so, the ceiling rails 2453 may be spaced apart from the ceilings of the second unit accesses 2410 or the both lateral sides of the first unit accesses 2400.

Brackets 2455 protrude from the inner walls 2051 of the leg wells 2050 horizontally to support the jacking units 2110.

That is, the jacking units 2110 move downwardly in the vertical direction by the crane (not shown) and move to the brackets 2455 horizontally by the ceiling rail type moving device 2450, and thus may be installed to the brackets 2455.

The jacking units 2110 may be fixed to the brackets 2455 of the unit mounting portions 2310 by bolting or welded by welding according to property of the floating structure.

The pinions of the jacking units 2110 may be exposed through the openings 2350 of the inner walls 2051 of the leg wells 2050.

Meanwhile, other type, for example, housing type unit mounting portions 2310A may further include inner doors 2457. In this case, the inner doors 2457 may include locking device (not shown) may serve as openable partitions or entrances. These inner doors 2457 may be coupled to floors 2459 of the unit mounting portions 2310A to open and close the opposite sides of the openings 2350, that is, the rear sides of the unit mounting portions 2310A.

When the unit mounting portions 2310A are closed by the inner doors 2457, the jacking units 2110 may be accommodated in the unit mounting portions 2310A.

Support plates 2480, as portions corresponding to corners where the second unit accesses 2410 are overlapped with the first unit accesses 2400, may be further provided rear side the inner doors 2457.

The support plates 2480 maintain the same level as the floors 2459 of the unit mounting portions 2310A. The inner doors 2457 may be positioned at stoppers 2481 of the support plates 2480 when the inner doors 2457 are opened horizontal. In this case, the support plates 2480 may support the inner doors 2457 horizontally. That is, the support plates 2480 may maintain the horizontal state of the inner doors 2457 after the inner doors 2457 are opened.

In other words, the inner doors 2457 may be pivoted about hinges of the floors 2459 by a worker. The horizontal state of the inner doors 2457 may be maintained by which the pivot of the inner doors is stopped by the stoppers 2481 of the support plates 2480.

At this time, a worker may lower the jacking units 2110 along the first unit accesses 2400 using a crane.

A worker may move the jacking units 2110 horizontally by placing moving plates (not shown) with wheels on the surfaces of the inner doors 2457, by placing the jacking units 2110 on the moving plates, and by pushing the moving plates. The worker installs the jacking units 2110 on the floors 2450 and closes the inner doors 2457 such that the jacking units 2110 are accommodated in the unit mounting portions 2310A.

As such, according to this embodiment, a plurality of jacking units 2110 installed through accesses are provided so that installation and maintenance of the jacking units 2110 may be easily carried out.

Hereinafter, a third embodiment of the present invention will be described with reference to FIGS. 8 to 13. The duplicated descriptions of the elements described in the first or the second embodiments will be omitted in this embodiment. By doing so, only features of the third embodiment will be described clearly.

Figure 8:
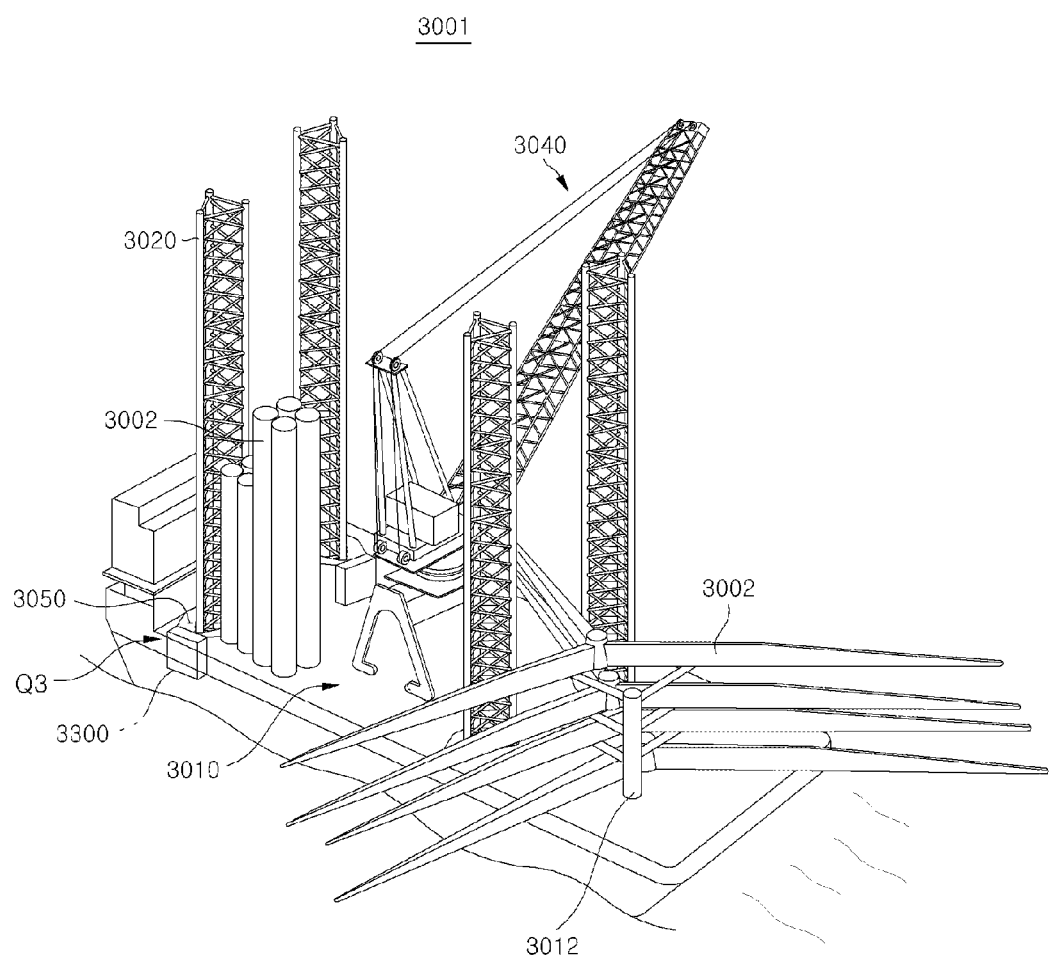
FIG. 8 is a perspective view illustrating a floating structure according to still another embodiment of the present invention.

Referring to FIG. 8, a floating structure 3001 may include a main body 3010, legs 3020, a crane 3040, leg wells 3050, and a third unit installation means Q3. In this case, the third unit installation means Q3 may also position the jacking units in the main body 3010. For example, the third unit installation means Q3 may be jacking units recesses 3300 positioned in the main body 3010.

According to the third embodiment, the floating structure 3001 may also include loads 3002 and a rack unit 3012 for the loads 3002.

The jacking unit recesses 3300 may be arranged in a triangular form along inner walls of leg wells 3050 through which the legs 3020 pass and may provide a lifting force to the legs 3020 while supporting the legs 3020 such that the legs 3020 and the main body 3010 may move relatively in the vertical direction by the jacking units of the jacking unit recesses 3300.

The jacking unit recesses 3300 and the jacking units installed therein may be driving unit lifting and lowering the legs 3020 or lifting and lowering the main body 1010 due to the relative movement against the legs 3020.

Due to the operations of the jacking units, the legs 3020 may move vertically against the main body 3010, or the main body 3010 may move vertically against the legs 3020, that is, be lifted or lowered after the legs 3020 are fixed in the seabed.

The jacking unit recesses 3300, as surroundings of the inner walls of the leg wells 3050 of the main body 3010, are positioned in the main body 3010 so that the shipping space on a main deck of the main body 3010 may be increased and thus the space availability of the main deck of the main body 1010 may be improved.

Figure 9:
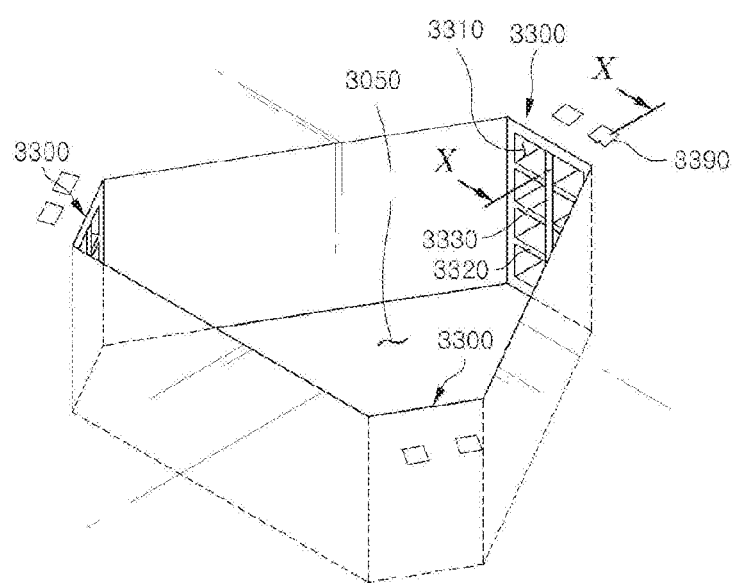
FIG. 9 is a perspective view illustrating a leg well including a jacking unit recess shown in FIG. 8.
Figure 10:
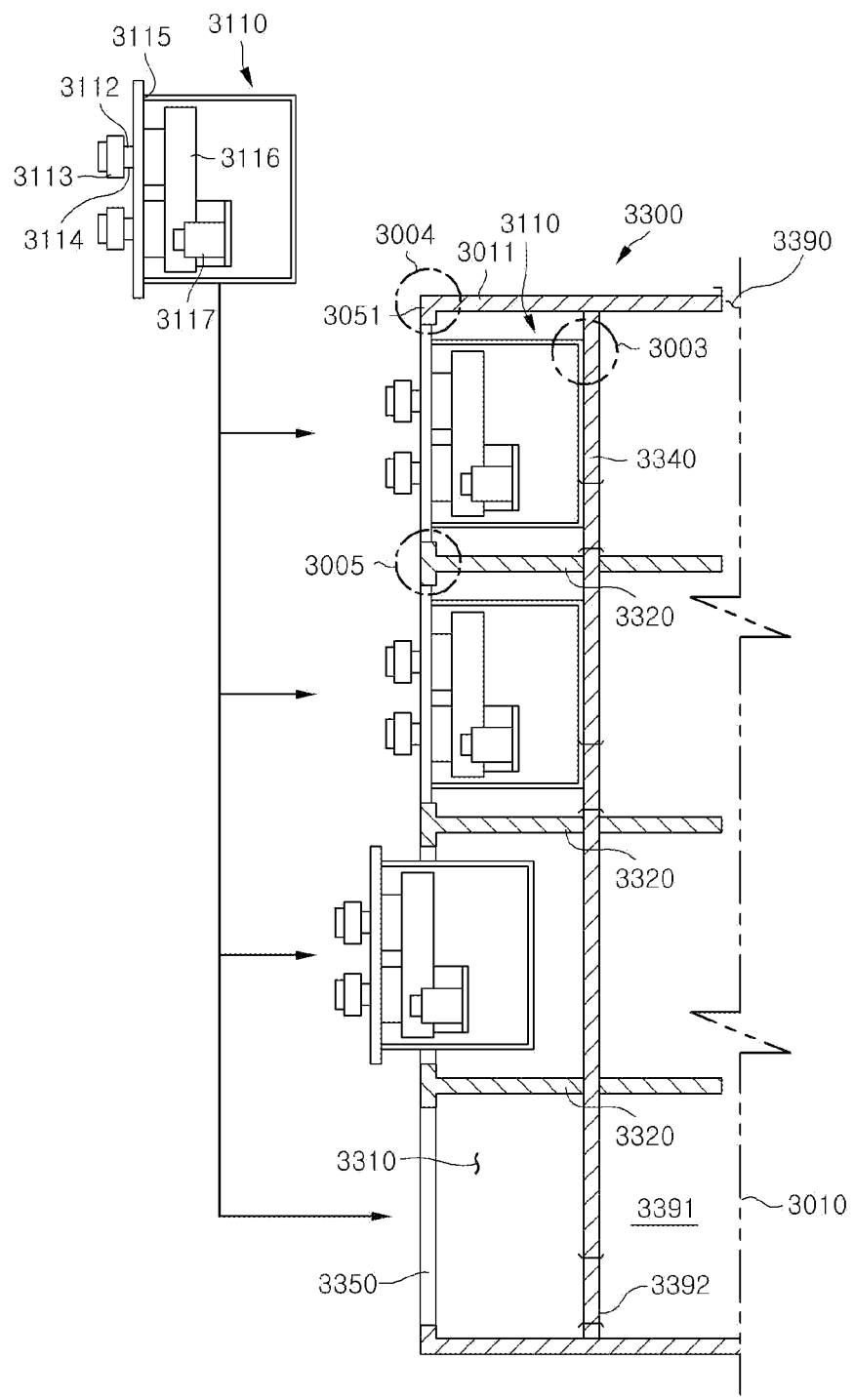
FIG. 10 is a sectional view taken along the line X-X of FIG. 9.

Referring to FIGS. 9 and 10, the jacking unit recesses 3300 have a plurality of unit mounting spaces 3310. The unit mounting spaces 3310 is used when the jacking units 3110 are slid into and mounted in the jacking unit recesses 3300. In this case, the unit mounting spaces 3310 may be positioned adjacent the racks of the legs in the leg wells 3050 of the main body 3010.

The jacking units 3110 may be rolled and inserted into the unit mounting spaces 3310 by rolling devices such as rollers.

The main body 3010 may be provided with void spaces 3391 at the rear sides of the jacking unit recesses 3300 such that the jacking units 3110 are repaired and checked.

Third compartments 3340 adjoining the void spaces 3391 may be provided with access holes for accessing the unit mounting spaces 3310.

The access holes 3392 may be closed instantly by covers or configured such that the covers may be separated therefrom.

Access roads for a worker to advance the void spaces 3391 may be configured such that upper sides communicated from the main deck 3011 to the interior of the main body 3010 can be opened and closed by hatches (not shown).

Each of the jacking units 3110 may include a unit housing 3115 spaced apart from a pinion 3113 engaged with a rack of the legs of the floating structure, a sealing 3114 disposed between the unit housing 3115 and the pinion 3113, and a gearbox 3116 disposed in the unit housing 3115 and transmitting a driving force to the pinion 3113.

Each of the jacking units 3110 may include a pinion shaft 3112 at an output side of the gearbox 3116, while the pinion 3113 may be coupled around the pinion shaft 3112.

Each of the jacking units 3110 may further include a motor 3117 connected to the gearbox 3116 to drive the gearbox 3116.

Each of the box-shaped unit housings 3115 may be further provided with an access hole (not shown) allowing a worker to access the box-shaped unit housing 3115.

Each of the jacking units 3110 may further include a lifting lug (not shown) such that the jacking unit 3110 may be lifted and moved by a crane.

The jacking units 3110 may be provided in the respective unit mounting spaces 3310 in a kind of module.

Each of the jacking unit recesses 3300 may have at least one unit mounting space 3310 defined around the leg wells 3050.

In this case, the plural of the unit mounting spaces 3310 may be disposed in the vertical direction and the horizontal direction of the inner walls 3051 of the leg wells 3050.

To this end, each of the jacking unit recesses 3300 may include a first compartment spaced apart in a first direction (for example, in the vertical direction) of the jacking unit recess 3300, a second compartment 3330 spaced apart in a second direction perpendicular to the first direction, and a third compartment 3340 communicated with the first and the second compartments 3320 and 3330 to finish a side of each of the unit mounting spaces 3310.

Each of the jacking unit recesses 3300 may further include a plurality of entrances (or 'entry') 3350 opened in the inner wall 3051 of the leg well 3050 in each of the unit mounting spaces 3310.

The first compartments 3320 may correspond to structures on the floor or the ceilings of the unit mounting spaces 3310. The second and the third compartments 3330 and 3340 may correspond to right and left walls or rear walls of the unit mounting spaces 3310.

The first to third compartments 3320, 3330, and 3340 may be communicated with structures of the main body 3010 and integrated with the main body 3010.

The jacking unit recesses 3300 may be configured such that the jacking units 3110 are slid thereinto and mounted in by the unit mounting spaces 3010, and coupled with the jacking units 3110 by bolting as described later.

Figure 11:
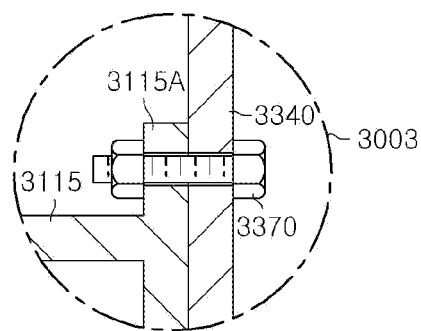
FIG. 11 is an enlarged sectional view illustrating a circle (3003) shown in FIG. 9.

For example, referring to FIGS. 10 and 11, a rim of the unit housing 3115 facing the third compartment 3340 may be provided with flanges 3115A having a plurality of bolt holes.

Moreover, each of the third compartments 3340 corresponding to rear walls of the unit mounting spaces of the jacking unit recesses may be provided with bolt holes so that the third compartments 3340 may be connected to the flanges 3115A with bolts 3370 and nuts.

The flanges 3115A of the unit housings 3115 may be attached closely to the third compartments 3340.

That is, the bolts 3370 and the nuts are fastened through the bolt holes of the flanges 3115A and the third compartments 3340 so that the unit housings 3115 may be attached to the third compartments 3340.

Figure 12:
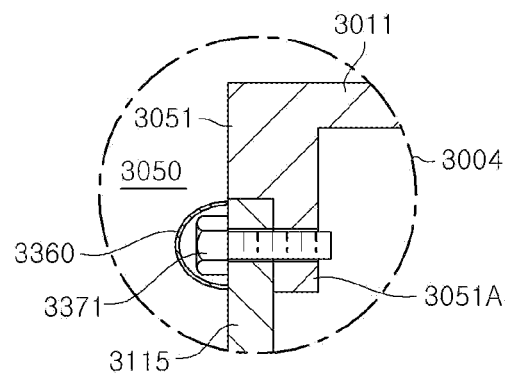
FIG. 12 is an enlarged sectional view illustrating a circle (3004) shown in FIGS. 9.

Referring to FIG. 12, each of the unit housings 3115 may include a rim protruded from the outer surface of the unit housing 3115.

The rims of the unit housings 3115 may be coupled with rim stoppers 3051A of the inner walls 3051 of the leg wells 3050.

The rim stoppers 3051A of the inner walls 3051 of the leg wells 3050 may be corners between the main deck 3011 and the inner walls 3051 of the leg wells 3050.

The rims of the unit housings 3115 of the jacking units and the rim stoppers 3051A of the entrances 3350 may be overlapped with each other and coupled with each other with a plurality of bolts 3371 penetrating therethrough.

In order to prevent corrosion from seawater, head-protective covers 3360 for the bolts 3371 may cover heads of the bolts 3371.

The head-protective covers 3360 may be fixed on the inner walls 3051 of the leg wells 3050 and surfaces of corners of the main deck 3011 by press-fitting or adhesive.

Figure 13:
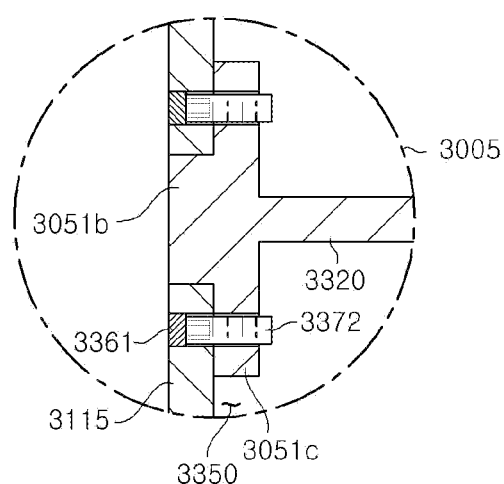
FIG. 13 is an enlarged sectional view illustrating a circle (3005) shown in FIG. 9.

Referring to FIG. 13, rim stoppers 3051C, on which rims of the unit housings 3115 of the corresponding jacking units may be placed, may be formed at the rims of the entrances 3350 on the inner walls 3051B of the leg wells 3050 connected to the first compartments 3320 defining the unit mounting spaces 3310 in the vertical direction.

The rims of the unit housings 3115 of the jacking units and the rim stoppers 3051C may be overlapped with each other and coupled with each other by bolts 3372 inserted into the bolt holes.

In this case, the bolt holes may be configures such that upper sides of the bolts 3372 are positioned at the lower sides of the bolt holes.

Caps or the head-protective coves 3361 in the form of finishing materials similar as described above have a diameter to be inserted into the bolt holes so that the caps or the protective covers 3361 may be inserted into the bolt holes to finish the entrances of the bolt holes.

That is, the head-protective covers 3361, in order to protect the bolts 3372 from corrosion caused by the seawater, may be inserted into the bolt holes for the bolts 3372 and positioned above the bolt heads of the bolts 3372.

In this case, the head-protective convers 3361 may seal the bolt holes by press fitting or adhesive and as a result may prevent corrosion of the headless bolts 3372 from the seawater.

As such, the jacking unit 3110 may be inserted into the unit mounting spaces of the jacking unit recesses by every unit in the drawer assembly type so that installation, repair, and maintenance can be easily carried out by every unit.

While the description of the present invention has been made to the exemplary embodiments, various changes and modifications may be made without departing from the scope of the invention. The embodiment of the present invention is not limited thereto. Therefore, the scope of the present invention should be defined by the appended claims rather than by the foregoing embodiments.

INDUSTRIAL APPLICABILITY

Jacking units are installed in the main body of the floating structure of the present invention. As a result, the floating structure having an increased shipping space for the loads is provided so that industries for installing marine wind turbine can be invigorated.

Moreover, the present invention may provide a floating structure in which installation and maintenance of the jacking units may be easily carried out.

The invention claimed is:

1. A floating structure comprising:
   a main body including leg wells;
   legs penetrating the leg wells and having cords and racks;
   at least one lacking unit generating a lifting force to move the legs and the main body in the vertical direction; and
   a unit installation means coupled with the main body to position the at least one jacking unit in the main body,
   wherein the unit installation means comprises:
      a case installation unit disposed to correspond to the cords and the racks of the legs along inner walls of the leg wells; and
      a jack case installed in the case installation unit to accommodate the at least one jacking unit to move the legs in the vertical direction,
   wherein the jack case is positioned in the case installation unit to prevent protrusion of the jack case above a main deck of the main body.

2. The floating structure according to claim 1, wherein the jack case include a housing in which the at least one jacking unit is positioned;
   wherein the housing comprises:
   a bottom plate having passing recesses through which the cords, the racks, and an end of a brace of the legs pass vertically;
   lateral plates protruded from both sides of the bottom plate;
   an upper plate connecting upper ends of the lateral plates to each other and having the same passing recesses as the passing recesses of the bottom plate;
   a pair of front plates connecting the lateral plates, the bottom plate, and front ends of the upper plates and spaced apart from each other by a distance such that the cords of the legs, the racks, and the end of the brace may pass therethrough in the vertical direction;

a rear plate separately coupled to rear ends of the lateral plates, the bottom plate, and the upper plate; and bulkheads spaced apart from the front plates in parallel, connected between the lateral plates, and having installation holes that have the same size as a unit housing of the at least one jacking unit to insert the at least one jacking unit thereinto; and finishing plates connected between the bulkheads and the front plates around the installation holes.

3. The floating structure according to claim 2, wherein the at least one jacking unit comprises:

bearing blocks installed to the front plates;
pinion shafts rotatably coupled in the bearing blocks;
pinions coupled around the pinion shafts at rear sides of the bearing blocks;
sealings coupled around the pinion shafts at the rear sides of the pinions;
unit housings coupled with the sealings at a front side and rims of the unit housings coupled in the installation holes of the bulkheads;
gearboxes installed in the unit housings and transmitting a driving force to the pinion shafts; and
motors connected to the gearboxes to drive the gearboxes.

4. The floating structure according to claim 1, wherein the case installation unit includes one more maintenance passage allowing access to the jack case.

5. A floating structure comprising:
a main body including leg wells;
legs penetrating the leg wells and having cords and racks;
at least one jacking unit generating a lifting force to move the legs and the main body in the vertical direction; and
a unit installation means coupled with the main body to position the at least one jacking unit in the main body,
wherein the unit installation means comprises at least unit mounting portion to receive the at least one jacking unit and positioned in the main body;
wherein the unit mounting portion includes:
openings in which the leg wells are positioned;
first unit accesses penetrating a main deck of the main body; and
second unit accesses through which the at least one jacking unit moves.

6. The floating structure according to claim 5, wherein the at least one jacking unit comprises:
a pinion shaft having a pinion engaged with the rack;
a gearbox transmitting a driving force to the pinion shaft;
a motor driving the gearbox; and
entrance rims of the first unit accesses are formed with a raised section protruded from an upper portion of the main deck.

7. The floating structure according to claim 5, wherein the unit installation further comprises:
guide rails extending toward the openings; and
moving carts to move the at least one jacking unit on the guide rails.

8. The floating structure according to claim 7, wherein the moving carts comprise:
wheels rolling along the guide rails; and
a moving plate or a frame to which the wheels are rotatably coupled and on which the at least one jacking units are placed.

9. The floating structure according to claim 5, wherein the unit mounting portion further comprises a ceiling rail type moving device;
wherein the ceiling rail type moving device comprises:
ceiling rails extending toward the openings;
a bed on which the at least one jacking unit is placed; and
rollers connected to the bed and moving while being hung from the ceiling rails.

10. The floating structure according to claim 9, wherein the unit mounting portion further comprises brackets fixing the at least one jacking unit transported by the ceiling rail type moving device.

11. The floating structure according to claim 10, wherein the unit mounting portion further comprises an inner door opening and closing the unit mounting portion.

12. The floating structure according to claim 11, wherein the unit mounting portion further a support plate maintaining a horizontally-opened state of the inner door.

13. A floating structure comprising:
a main body including leg wells;
legs penetrating the leg wells and having cords and racks;
at least one jacking unit generating a lifting force to move the legs and the main body in the vertical direction; and
a unit installation means coupled with the main body to position the at least one jacking unit in the main body,
wherein the unit installation means further comprises a jacking unit recess positioned in the main body as surroundings of the leg wells;
wherein the jacking unit recess has a unit mounting space and the at least one jacking unit is installed in the unit mounting space; and
wherein the jacking unit recess comprises:
a first compartment spaced apart in a first direction of the jacking unit recess;
a second compartment spaced apart in a second direction perpendicular to the first direction; and
a third compartment communicated with the first and the second compartments to finish a side of the unit mounting spaces.

14. The floating structure according to claim 13, wherein the at least one jacking unit comprises:
a unit housing spaced apart from the pinion engaged with the rack of the legs;
a sealing disposed between the unit housing and the pinion; and
a gearbox disposed in the unit housing and transmitting a driving force to the pinion.

15. The floating structure according to claim 14, wherein the unit housing comprises flanges formed at a rim of the unit housing facing the jacking unit recess and the flanges are coupled with the jacking unit end recess.

16. The floating structure according to claim 14, wherein the unit housing comprises a rim protruded from an outer surface of the unit housing wherein the rim of the unit housing is coupled with a rim stopper of the inner walls.

17. The floating structure according to claim 16, wherein the rim of the unit housing of the at least one jacking unit and the rim stopper are overlapped with each other and coupled with each other with a plurality of bolts,
further comprising head-protective covers covering heads of the bolts.

* * * * *